United States Patent [19]

Morganstein et al.

[11] Patent Number: 4,809,321
[45] Date of Patent: Feb. 28, 1989

[54] BUSY/NO-ANSWER CALL COMPLETION EQUIPMENT

[75] Inventors: Sanford J. Morganstein, Elgin; Bakulesh A. Mehta, Downers Grove; Herbert B. Krakau, Elmhurst, all of Ill.; Neil F. N. Milsted, Houston, Tex.; Mark D. Klecka, Dekalb, Ill.

[73] Assignee: Dytel Corporation, Schaumburg, Ill.

[21] Appl. No.: 909,755

[22] Filed: Sep. 22, 1986

[51] Int. Cl.$^4$ ............................................. H04M 3/58
[52] U.S. Cl. ................................... 379/211; 379/210; 379/214
[58] Field of Search ............... 379/201, 209, 210, 211, 379/212, 213, 214, 88, 67, 84, 89

[56] References Cited

U.S. PATENT DOCUMENTS

| 3,956,595 | 5/1976 | Sobanski | 379/209 X |
| 4,696,028 | 9/1987 | Morganstein | 379/213 X |

FOREIGN PATENT DOCUMENTS

| 0096447 | 6/1983 | Japan | 379/211 |
| 0121865 | 6/1985 | Japan | 379/88 |

OTHER PUBLICATIONS

"OPCOM D.I.A.L. Telemessaging System", Brochure, OPCOM, Sep., 1984.

Primary Examiner—James L. Dwyer
Attorney, Agent, or Firm—Jerry W. Mills; Roger N. Chauza

[57] ABSTRACT

Call completion equipment (10) is disclosed for use with a switching system (14) for assisting callers to complete telephone calls thereto. If a primary destination telephone set (16) is busy or does not answer, a message is transmitted from a message storage unit (54) to the calling party. The message relates to the selection by the caller of secondary destinations including a switchboard attendent 18, an alternate destination telephone set, a camp-on option or voice messaging facilities. A processor complex (72) processes the digits dialed by the caller in response to the message, using various look-up tables (85–87), and transfers corresponding information to the switching system (14). The switching system (14) completes the call to the secondary destination according to the information. The invention (10) provides automatic camp-on features (87) with regard to predefined telephone sets of the switching system (14). Self-adaptive tone learn apparatus (50) and programs (88) are provided to learn the particular signature characteristics of call progress tones transmitted by the telephone switching system (14).

32 Claims, 6 Drawing Sheets

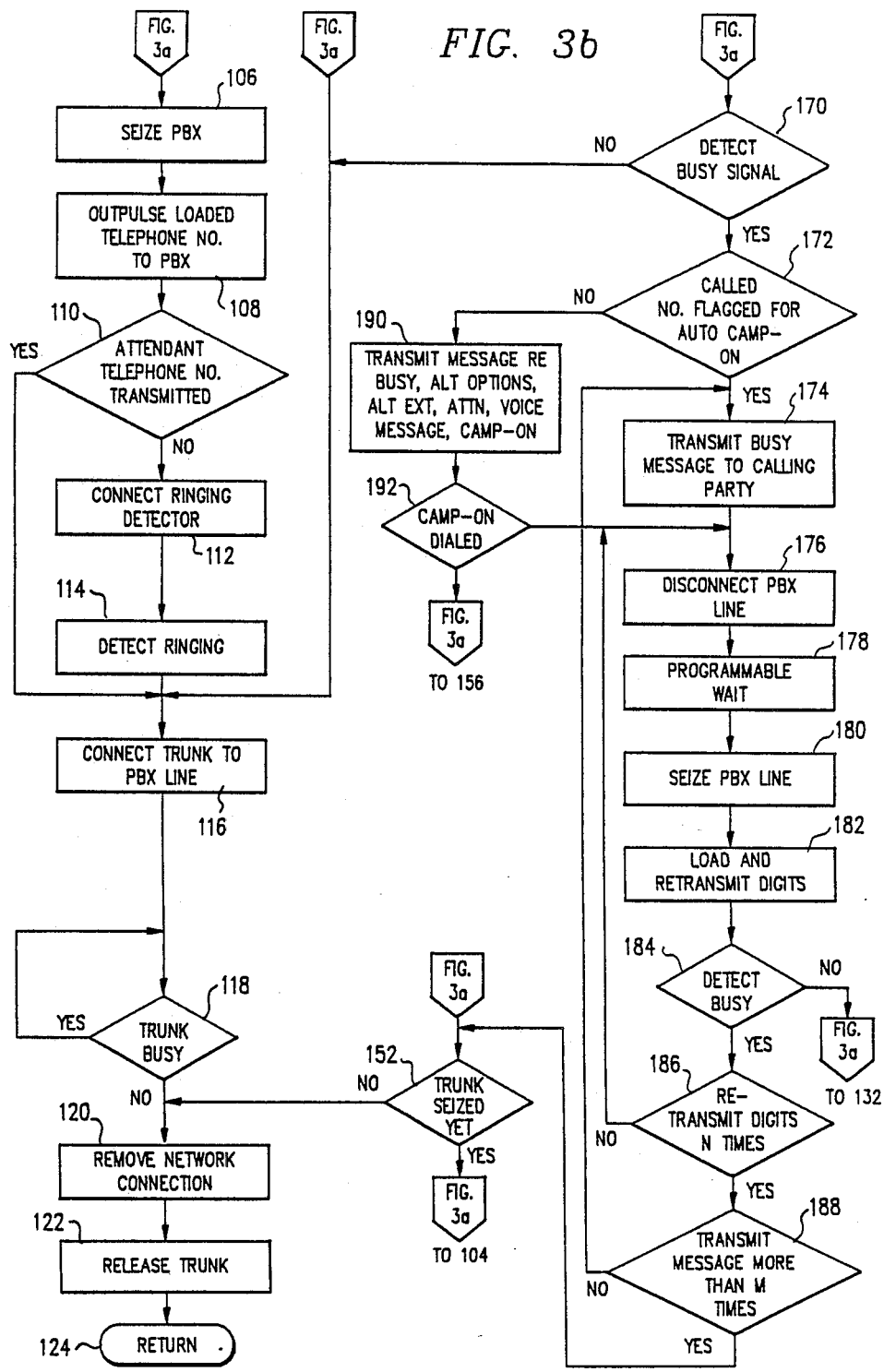

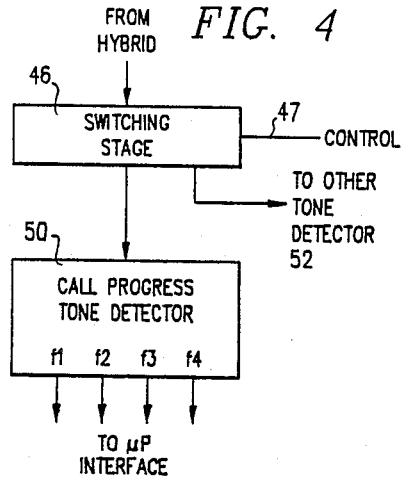
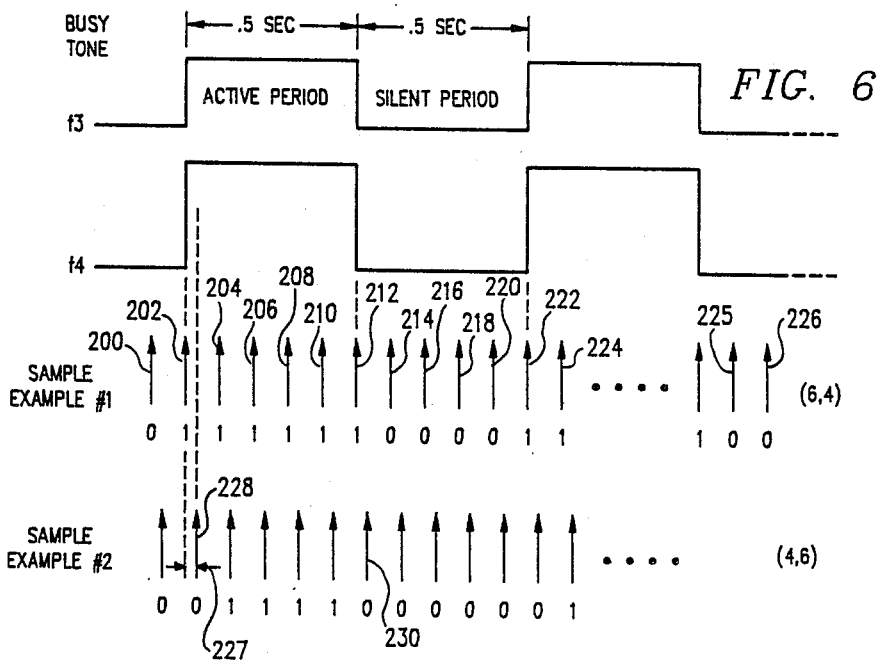

BUSY/NO-ANSWER CALL COMPLETION EQUIPMENT

TECHNICAL FIELD OF THE INVENTION

The present invention relates in general to telecommunications equipment, and more particularly relates to equipment for enhancing call completions to telephone switching systems, such as PBX or Centrex-type switching systems.

BACKGROUND OF THE INVENTION

The business and commercial importance of communications is evidenced by the continuing efforts to provide new facilities and features for making communications easier and faster. Recent developments in the telecommunications industry have lead to communications via satellite, from automobiles and airplanes. Many customer features, such as speed dialing, call forwarding and camp-on are readily available as commonplace features to many telephone users.

There are many unavoidable situations in which it may not be possible to communicate via a telephone system with another party, at certain times. For example, the immediate and direct communication with another party who is either busy or absent must be delayed. This not only represents a loss of time for the calling party, but especially if the call concerns business matters.

It can be seen that a need exists for improved communication techniques and apparatus for assisting calling parties in completing their telephone calls. A particular need exists in connection with telephone switching systems for assistance in completing telephone calls to alternate caller-selected destinations if the original called party is busy or absent.

SUMMARY OF THE INVENTION

In accordance with the present invention, improved apparatus and techniques are disclosed which substantially reduce or eliminate the shortcomings associated with the prior art techniques. In accordance with the invention, a calling party placing a telephone call to a destination which is either busy or in which there is no response is provided with a choice of alternate destinations, or other actions. Thus, in spite of the unavailability of the primary party, the calling party is presented with an additional opportunity to avoid merely terminating the call upon reaching a busy or nonanswering destination.

In the situation where the telephone call cannot be completed because the destination telephone set is off-hook, and thus the called party is busy, an associated busy signal is detected by the invention, whereupon a message is transmitted to the calling party in addition to the audible busy signal. The message is of an informative nature notifying the calling party that the destination telephone is busy and that the caller will be automatically transferred to a default telephone number, such as an operator or attendant.

Depending on the desired system configuration of the invention, a message may be transmitted to the calling party in response to the busy signal, informing the calling party either to dial another telephone number, to leave a spoken message for later retrieval by the called party, or instruct the calling party to simply wait until the called party goes on-hook so that the call can be completed, e.g. camp-on. The camp-on option of completing the call when the called party goes on-hook may be selected by the calling party by dialing a particular code in response to the transmitted instruction message. Alternatively, the calling party may be automatically placed on camp-on without dialing any digits, depending upon the telephone number initially dialed by the calling party. For example, when a calling party dials a sales department of a business, and obtains an initial busy status, it may be desirable to provide the automatic camp-on so that the potential customer is given no optional secondary destination.

The invention also provides for alternate assistance to the calling party in the event the destination telephone is not answered. The continued ringing of the destination telephone beyond a predetermined period of time establishes a no-answer situation. As with the busy signal situation, the audible ringing signals are suppressed and prevented from being returned to the calling party. Instead, a more pleasant message is transmitted to the calling party concerning the ringing status, and the continued attempt to each the destination party. Again, the invention provides the calling party the option of dialing another telephone number without going on-hook, or the automatic connection to a switchboard attendant for further assistance. The message may instruct the calling party to dial the switchboard attendant number, or simply be automatically connected thereto after a certain no-answer period has lapsed.

The particular signature or footprint of the audible ringing signal and busy signal transmitted by a switching system to the invention can be stored and appropriately responded to when subsequently detected. The invention can thus "learn" the particular signature of call progress tones transmitted by destination switching systems. Call progress tones to be learned are cyclically sampled during the active and silent periods thereof to determine the presence or absence of standard fundamental frequencies forming the composite call progress tone. During these samples, the presence or absence of either of the fundamental frequencies is noted. The cadence of the tone is determined by counting the total number of samples taken during a full tone period and during a full silent period. These two counts characterize the cadence which, together with the frequency, provide a format against which subsequently received call progress tones are compared to define whether a busy tone, a ringing tone or a dial tone is being detected. With this technique, the nonstandard tone generators can be learned and the signatures thereof stored for later identification as call progress tones.

The signature of learned tones comprises a frequency component identification and a number range corresponding to the number of samples of the cadence of the active and inactive tone periods. During detection of a progress tone, samples of the active and inactive period are taken, and compared to the corresponding ranges to ascertain whether they fall within the range. The frequency of the detected call progress tone is also compared to those tones learned for correspondence. On a positive comparison of the parameters of the detected tone with the signature of one of the learned tones, the detected tone can be categorized and the call can be processed accordingly.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same elements throughout the views, and in which:

FIGS. 3a and 3b illustrate in block diagram form a program flow chart executed by a processor to provide the functions of the invention;

FIG. 4 is a simplified block diagram of the tone detector apparatus of the invention;

FIG. 5 is a table listing the frequencies and cadences of various standard call progress tones;

FIG. 6 illustrates an example of the scheme for detecting call progress tones;

DETAILED DESCRIPTION OF THE INVENTION

Figure 1:
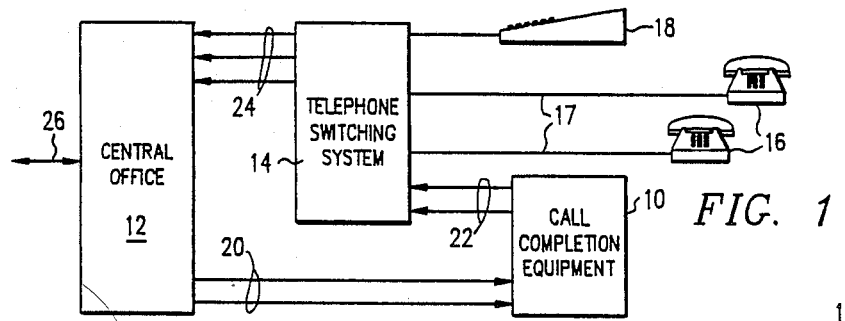
FIG. 1 is a block diagram illustrating an application in which the invention may be advantageously practiced.

The application of the present invention is best understood by referring first to FIG. 1 of the drawings where there is illustrated the invention interconnected with a telecommunication network. Particularly, the invention 10 is shown as adjunct equipment 10 associated with a telephone switching system, such as a private branch exchange (PBX) telephone system. While the invention is ideally suited for use with an on-premises type of telephone switching system 14, the illustrated application is not to be construed as a limitation to the uses of the invention. Moreover, the invention may be integrated within many types of telephone switching systems, rather than being added on as adjunct equipment.

The telephone system 14 may be of the type which serves a plurality of telephone sets 16, and equipped with a switchboard attendant 18. In one type of arrangement, the call completion equipment 10 is connected to the central office 12 by one or more incoming trunks 20 on which telephone calls are directed to the telephone system 14. Incoming telephone calls on trunks 20 are processed by the call completion equipment 10 and redirected to the on-premises system 14 by communication lines 22. Calls originated within the telephone switching system 14 by one of the telephone sets 16 are processed by the telephone switching system 14 and redirected to the central office 12 on one of the outgoing trunks 24. The central office 12 is generally equipped with an interoffice trunk 26 for providing telephone communications to other central offices, or to tandem long distance switching equipment (not shown).

According to the operation of the invention, all incoming calls from the central office 12 to the telephone switching system 14 are first received by the call completion equipment 10 on incoming trunks 20. In an alternate method of operation, calls can be received by the switching system 14 and sent to the call completion equipment 10 over lines 22 which may be of the station or trunk type. Dialing information received on incoming trunks 20 is processed by the call completion equipment 10 in a manner similar to that described in U.S. Pat. No. 4,096,028 and entitled PBX Intercept and Caller Interactive Attendant Bypass System. According to the noted system, the interactive system transmits a message over the trunk 20 to the calling party, requesting the input of dialing information associated with the destination telephone set 16, e.g., the called party. On receipt of the digits dialed by the calling party, the interactive system forwards such digits on the communication lines 22 to the telephone switching system 14. The communication lines 22 may be conventional station lines, such as the types which connect the telephone switching system 14 to the telephone sets 16.

The telephone switching system 14, whether it be a PBX, Centrex system, key system or other type of telephone system, is adapted to readily recognize the extension number transmitted over communication lines 22. In a conventional manner, the telephone switching system 14 will transmit a ringing current to the telephone set 16 uniquely identified by the dialed digits. The telephone switching system 14 will also transmit audible ringing signals to the call completion equipment 10 via the communication lines 22. The telephone switching system 14 will continue to ring the selected telephone set 16 until the called party answers. In the event that the selected telephone set 16 is already off-hook, and is thus being currently used by the called party, the telephone switching system 14 will return a busy signal to the call completion equipment 10 by way of the communication lines 22. The audible ringing and the busy signals supplied by the telephone switching system 14 over the communication line 22 constitute call progress tones for alerting the calling party as to the status of the call which is attempted to be completed.

The present invention makes provisions for both of those instances in which the destination telephone set is not answered in response to an incoming call, and in which the destination telephone is off-hook, indicating the called party is busy. Heretofore, when the calling party was confronted with these two situations, the only alternative was to hang up and reattempt to complete the call at a later time. However, with the provision of the present invention, options are provided to the calling party for circumventing the busy and no-answer situations.

Figure 2:
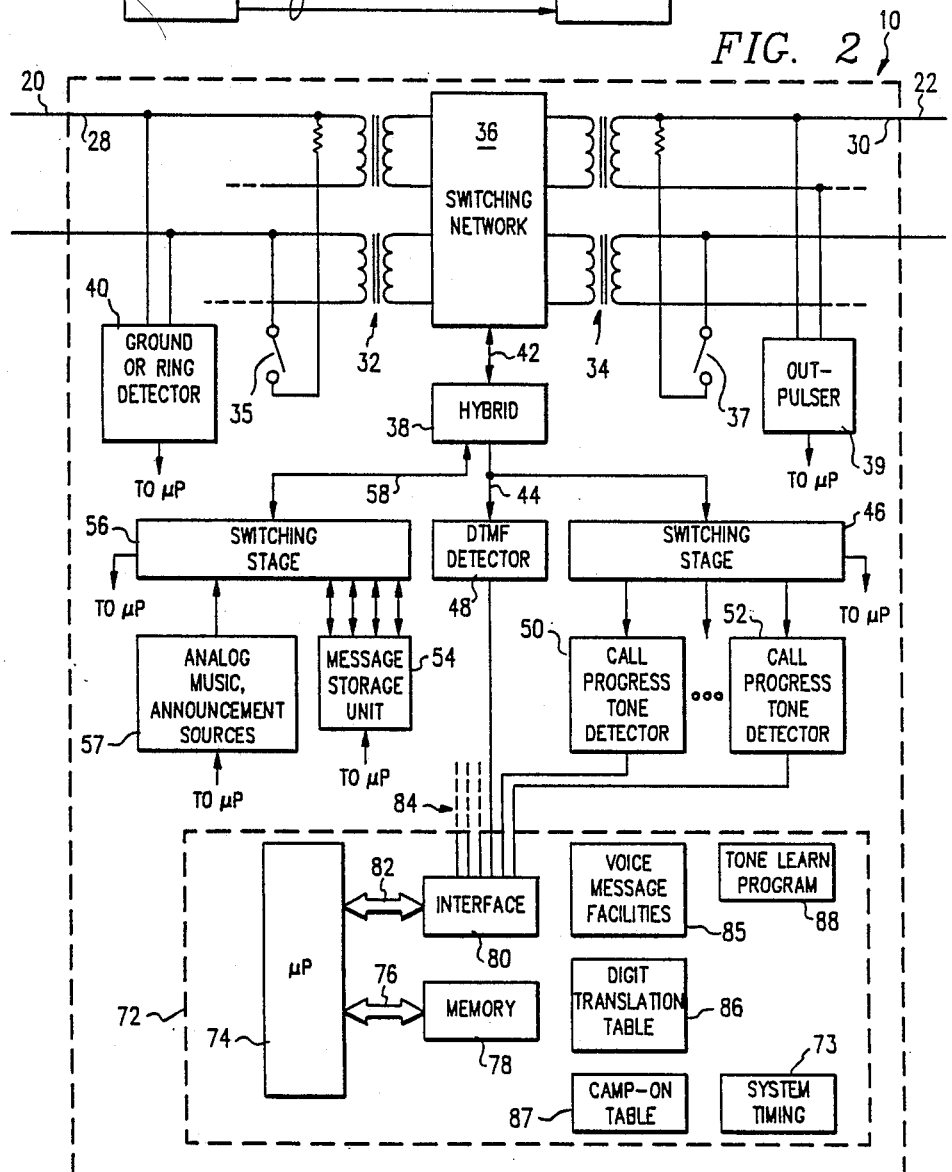
FIG. 2 is a detailed block diagram of the invention.

According to the invention shown in FIG. 2, the call completion equipment 10 is provided with an input port 28 connected to the incoming trunk 20. An output port 30 is connected to the communication line 22. The input port 28 and the output port 30 are transformer coupled by respective transformers 32 and 34 to a switching network 36. A pair of loop closure relay contacts 35 and 37 are independently operable to provide a closed loop to the respective incoming trunk 20 and the communication line 22. The loop closures signal the switching systems connected thereto of acknowledgements and requests for service. An outpulser 39 is bridged across the communication line 22 and is operable to outpulse a telephone number, either by DTMF signalling or by dial pulses, under control of other circuits of the call completion equipment 10. The switching network 36 is operative to couple the input transformer 32 either to the output transformer 34, or to a hybrid 38. A ground and ring detect circuit 40 is coupled to the input port 28 for detecting ground and ringing indications transmitted by the central office 12 on the incoming trunk 20.

The switching network 36 is connected to the hybrid 38 by a bidirectional conductor 42. The hybrid 38 is connected by a unidirectional outgoing conductor 44 to a first switching stage 46 and to a DTMF detector 48. The detector 48 is of conventional design and can provide an output responsive to the detection of the standardized DTMF signals transmitted by non-rotary type telephone sets. An integrated circuit suitable for use as a DTMF detector is identified as type 8870, and obtainable from Mitel Corporation. Dial pulse receivers can be used in combination with the DTMF detector 48, or in lieu thereof, to respond to digits dialed from a rotary-type telephone set. The first switching stage 46 is effective to selectively switch signals carried by the unidirectional outgoing conductor 44 to a pair of call progress tone detectors 50 and 52. Circuits suitable for call progress tone detection are identified as integrated circuit type LM 567, and obtainable from National Semiconductor. While each call progress tone detector 50 and 52 is effective to detect call progress tones, the following description will proceed assuming that the first switching stage 46 couples tones from conductor 44 to detector 50.

A message storage unit 54 for storing a plurality of messages is switchably connected by a second switching stage 56 to an input port 58 of the hybrid 38. With this arrangement, messages can be transmitted through the hybrid 38 in one direction, and call progress signals can be simultaneously received by the call progress detector 50 through the hybrid 38 in an opposite direction. The message storage unit is connected to the switching stage by bidirectional buses so that information can also be input into the storage unit 54 via the input ports of the call completion equipment 10. With this capability, a call completion equipment administrator can effect a change, addition or deletion of the data stored within the storage unit. The administrator can, for example, place an incoming call to the call completion equipment 10 and by a code, or other means, place the equipment in a mode for accessing the storage unit 54 and changing the contents thereof. The switching stage 56 includes another input for switching a source 57 of analog music or voice announcements therethrough to the calling party. This may be accomplished, for example, during periods of time when the calling party is placed on hold or camp-on by the call completion equipment 10.

The call completion equipment 10 further includes a processor complex 72 for controlling all the electrical apparatus of the invention according to a software program. Timing and synchronization of all the electrical apparatus is controlled by many clock phases according to the system timing 73. The processor complex 72 includes a microprocessor 74 connected by a bidirectional bus 76 to a memory 78, including RAM and ROM storage areas. The memory 78 also includes various look-up tables described below. The bidirectional bus 76 is shown in simplified form, but in practice may include multiple bidirectional buses for carrying address and data information between the microprocessor 74 and the memory 78. Also included in the processor complex 72 is an interface 80 by which the microprocessor 74 can control the other electrical circuits of the call completion equipment 10.

A communication bus 82 couples signals between the microprocessor 74 and the interface 80. The interface 80 provides a plurality of outputs 84, each of which is connected to electrical circuits controlled by the microprocessor 74. For example, the microprocessor 74 receives information from the ground and ring detector 40 through the interface 80 indicating when ground and ringing conditions are present on the incoming trunk 20. The processor complex 72 can then execute appropriate instructions of its program to respond to the noted signals on the incoming trunk 20. The interface 80 is also connected to the various switching networks and stages 36, 46 and 56 so that various electrical paths can be established to route information to desired equipment in the call completion equipment 10. In a similar manner, the message storage unit 54 is processor controlled through the interface 80 to transmit appropriate messages through the second switching stage 56 to the calling party. The other circuits of the call completion equipment are controlled by the processor complex 72 in the manner described below with the software flow charts.

Stored in the memory 78 of the processor complex 72 are various tables referred to by the microprocessor 74 during the processing of an incoming call on trunk 20. A voice store and forward messaging table 85 includes those telephone extension numbers which are provided with voice messaging features. A digit translation table 86 may be consulted to automatically translate one extension number into another, such as is done with a call forwarding feature. A camp-on table 87 may be interrogated to ascertain whether an automatic camp-on function should be invoked in connection with predetermined telephone extension numbers. A tone learn program 88 may be employed to obtain and store the signature of call progress tones transmitted by the tone generator of the telephone switching system 14.

Figure 3A:
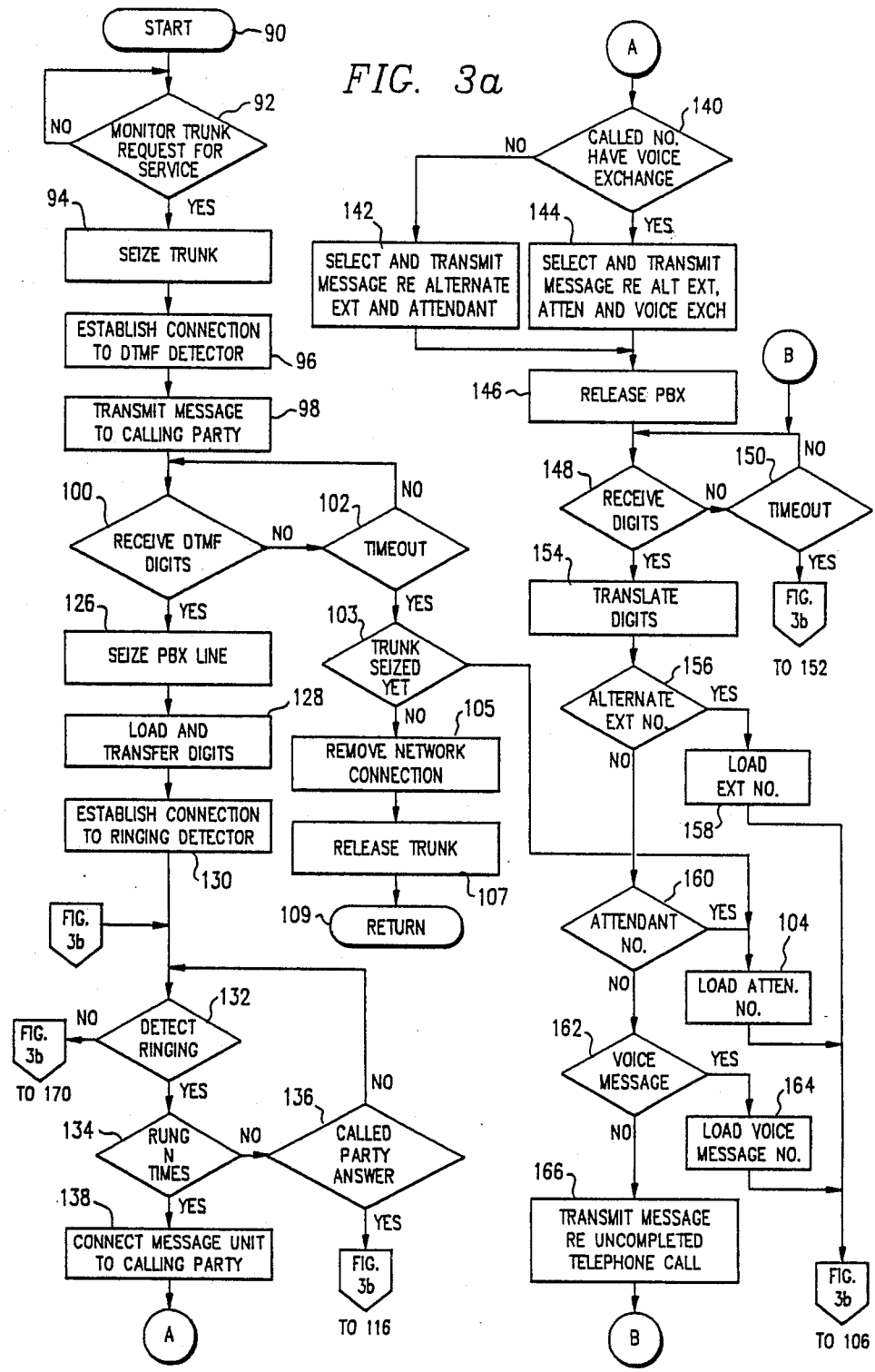

The call completion equipment 10 processes an incoming call from a central office 12 and redirects the telephone call to the telephone switching system 14 using the circuits as shown in FIG. 2, as controlled by the processor complex 72 in the manner shown by the flow charts of FIGS. 3a and 3b. More specifically, the flow charts illustrate a situation in which a call directed to the telephone switching system 14 causes a selected telephone set 16 to be rung, but such set is not answered by the called party. As noted above, this situation occurs frequently, with the result that the calling party generally has no alternative but to hang up and attempt to complete the call at a later time. Other more sophisticated systems, such as the type disclosed in the U.S. Pat. No. 4,696,008, provide an automatic nondiscretionary connection of the calling party to an attendant after it is apparent the called party is not going to answer.

Block 90 of the FIG. 3a flow chart indicates an initial program location to which the microprocessor 74 is directed for responding to requests for services received from the central office 12 over the incoming trunk 20. It should be understood that the incoming trunk 20 is merely exemplary of requests from parties originating a telephone call, as such request may originate from other types of lines, equipment or switching systems. Decision block 92 illustrates a decisional program loop in which the microprocessor 74 routinely monitors the ground and ring detector 40 by repetitively interrogating an associated appearance on the interface 84. Depending upon the type of incoming trunk 20 employed, a request for service may be in the form of a conventional ringing signal from the central office 12, or a ground applied to the tip conductor of the trunk 20. When such a request for service is detected by the detector 40 and presented to the microprocessor 74 by way of the interface 80, the incoming ringing is tripped by closing the trunk loop 20. The microprocessor 74 causes switch contacts 35 to be closed, thereby seizing the trunk 20 and allowing loop current to flow therethrough. As a result, the central office 12 detects the trunk loop closure and terminates the ringing signal.

Next, and according to flow diagram block 96, the processor complex 72 causes a connection to be established in the switching network 36 for connecting the incoming trunk 20 to the hybrid 38. The processor complex 72 also monitors the output of the DTMF detector 48 for DTMF dialing signals, and the output of the call progress tone detector 50 for progress tones. Block 98 represents the processor complex functions which select an appropriate message from the message storage unit 54, establish a connection in the switching stage 56 and transmit the selected message through the hybrid 38 and network connection 36 to the calling party over the incoming trunk 20.

The specific operations and apparatus for accomplishing this is set forth in more detail in the U.S. Pat. No. 4,696,028, the entire subject matter of which is incorporated herein by reference. Pursuant to the transmitted message, the calling party can dial the telephone extension number of the called party with whom communications are desired, without the need of the services of the telephone switching system switchboard attendant 18. Block 100 of the flow chart indicates the decisional block as to whether the digits of the extension number have been received. A timeout 102 of a predetermined period of time is established in the program to form a window in which the dialed digits can be received. If the calling party dials no information within this predetermined period of time, and if the incoming trunk is yet seized 103, control of the microprocessor 74 is branched to block 104 where the telephone number of a default answering position is loaded into a processor register.

In accordance with the flow diagram, the program is branched from block 104 to 106 (FIG. 3b) to establish a talking path between the default answering position 18 and the calling party. In other words, in the event that the calling party does not dial any digits in this time period, and does not go on hook, automatic assistance is provided by the connection to the switchboard attendant 18. With reference to flow diagram block 106, a PBX communication line 22 is seized by closing the switch 35. This is a conventional signal to the telephone switching system 14 of a request for service on the communication line 22.

According to block 108, the default answering position's telephone number previously loaded into the register is outpulsed by pulser 39 over the communication line 22. The telephone switching system 14 establishes a connection pursuant to the attendant's telephone number between the communication line 22 and the attendant 18.

The program branches next to decision block 110 and bypasses block 112 and 114 since the telephone number outpulsed by the system 10 was the default answering position's telephone number. With regard to block 116, the processor complex 72 establishes a connection in the switching network 36 between the communication line 22 and the incoming trunk 20. The calling party is then able to communicate with the default answering position call completion assistant 18 who can serve the communication needs of the calling party. The default answering position call completion assistant 18 may take a message or may connect the calling party in a conventional manner to alternate parties associated with the other telephone sets of the telephone switching system 14.

The call completion equipment 10 routinely checks whether the calling party remains connected to the incoming trunk 20, as indicated by the loop of flow diagram block 118. In the event that the processor control complex 72 determines that the communications have been terminated, the connection in the switching network 36 is removed 120, the incoming trunk 20 is released 122, and the microprocessor 74 returns 124 to the start position 90 of the program.

With reference back to block 103 of the FIG. 3a flow diagram, there is shown a situation in which the calling party may go on-hook during or after the transmission of the initial instructional message 98. In the event the calling party goes on-hook, i.e., abandons the call, the network connection is removed 105, the trunk is released 107 and control of the microprocessor 74 is returned 109 to the start 90 of the program.

With reference again to block 100 of the FIG. 3a flow chart, program control of the microprocessor 74 is transferred to block 126 in the event that dialed digits are received from the calling party in response to the initial instructional message 98. The PBX communication line 22 is seized by closing the contacts 37 bridged across the line 22. The digits received by the DTMF detector 48 are loaded into a temporary register for subsequent transfer to the telephone switching system 14. The output of the DTMF detector 48 is then monitored by the processor complex 72 to determine which pair of tones are received, and for determining the corresponding digit. The call progress tone detector 50 is also monitored by the microprocessor 74 to decode the specific type of call progress tone received. With this switched arrangement, the call progress tone detector 50 processes the signals output by the hybrid 38 to determine the nature and type of signal received. The functional features of the call progress tone detector 50 will be described in detail below. Nevertheless, it is sufficient to understand here that the call progress tone detector 50 can distinguish between many signals including a busy status or a ringing status of the called telephone set 16. With the call progress tone detector 50 connected as described, it can monitor progress signals generated by the telephone switching system 14 and transmitted to the call completion equipment 10 on the communication line 22.

According to block 132, if ringing is detected by the call progress tone detector 50, control is branched to a timeout loop 134. In the event that ringing is not detected, then control is branched to FIG. 3b where the completion of the telephone call is processed according to the detection of a busy signal. One skilled in the art would recognize that the processing described herein is time-shared among a plurality of calls and that the descriptions of control branching is to be taken figuratively, rather than literally. In the event ringing signals are detected, the microprocessor 74 determines whether the telephone set 16 has been rung a predetermined number of times. While the number of times the called telephone set 16 is rung before further action is taken is arbitrary, it is contemplated in the present invention that about five ringing cycles, or about twenty seconds, should elapse before subsequent action is taken. Beyond this time, it can be assumed that the called telephone set 16 will not be answered. However, if the called party answers 136 within this time period, control is branched to block 116, wherein the telephone switching system 14 is connected to the trunk 20 and the called party is thus connected to the calling party.

When it is evident that the called party associated with the telephone set 16 is not going to answer, and that further ringing is futile, a message is selected 138 in the message storage unit 54 and transmitted to the calling party. This message includes information concerning the situation in which the called telephone set 16 cannot presently be reached, but that the telephone call may be completed to a secondary destination by alternative means. For example, the calling party may be assisted by completing a call to another party associated with the telephone switching system 14, or by the assistance of the switchboard attendant 18, or by verbally depositing a message using voice store and forward messaging techniques.

Communication exchanges may be completed with the assistance of the voice messaging technique, without the concurrent exchange of conversations. In other words, one party may call a predetermined telephone number and leave a recorded message for another party. The other party may later call the number and retrieve the message, and also leave a response. This type of communication technique is described in U.S. Pat. No. 4,371,752. However, not all parties subscribe to or have available to them the optional communication through voice store and forward messaging techniques. Thus, the call completion equipment 10 of the invention must determine, as is shown in program block 140, whether the called party has a voice messaging option. If this determination is in the negative, a special message is selected 142 from the message storage unit 54 and transmitted to the calling party. This message will instruct the party as to the dialing of an alternate telephone extension number, or as to switchboard attendant assistance. If, on the other hand, the voice messaging option is available to the called party, a different message is selected 144 in the message storage unit 54 for transmittal to the calling party. This message includes the same informational content as that noted in block 142, and in addition advises the calling party that the voice messaging option is available.

The communication line 22 to the telephone switching system 14 is released 146 and the call completion equipment 10 awaits for the transmission of digits from the calling party. If digits are not received 148 within a timeout period 150, and if the trunk 20 is yet seized 152 (FIG. 3b) by a calling party, control of the program is branched to block 104 where the default answering position number is automatically loaded 104 and outpulsed 108 to the telephone switching system 14. The calling party is thereby automatically connected to the telephone switching system 14 for assistance. In the event the calling party has returned on-hook, as noted by block 152, the telephone call is terminated by removing 120 the network connection 36, releasing 122 the incoming trunk 20 and returning 124 to the start 90 of the program.

The receipt 148 of digits by the DTMF detector 48 is accompanied by the translation 154 of such digits to determine whether an alternate number or the default answering position number has been dialed, or whether the voice messaging option has been indicated. The receipt of a four digit number generally signifies a particular extension number associated with a particular telephone set 16. If a valid alternate extension number has been dialed 156 by the calling party, it is loaded 158 into a register for subsequent outpulsing. If the digits received from the calling party cannot be identified as a valid alternate extension number, the digits are next checked 160 to determine if a default answering position number has been received. The instructional message transmitted according to block 144 will generally specify what digits should be dialed in order to be connected to the telephone switching system default answering position call completion assistant.

Generally, it is only necessary to dial the digit "0" to obtain the assistance of a switchboard attendant, or some other default answering position. The instructional message transmitted to the calling party will indicate the digit or digits to be dialed for connection to the default answering position 18. While a representation of the digit "0" may be loaded directly into the register 104, an intermediate translation may be conducted in accordance with the translation table 86. For example, if call completion assistance is being handled by a telephone set other than the switchboard 18, then the telephone number of the other set can be loaded into the register 104 instead of the switchboard designation "0". This aspect is advantageous when a switchboard attendant 18 is not available, such as during lunch or at night, calls can still be completed to an alternate destination, such as a guard station or the like.

If neither an alternate extension number 156 nor a default answering position number 160 have been received and decoded by the DTMF detector 48, the digits received are next checked to ascertain if they designate the voice message option 162. Again, the instructional message transmitted pursuant to flow chart block 144 will inform the calling party as to the manner in which to access can be had to the voice mailbox. While arbitrary, the instructional message can specify that the dialing of the "*" symbol will be decoded as an instruction to connect the calling party to a voice messaging facility. If the dialed digit or digits received from the calling party signify the voice message option 162, the appropriate number is loaded into the register 164 for subsequent outpulsing to the telephone switching system 14. A translation of the voice message designation symbol is made, and the translated number is loaded into the register 164. The translated number will be that number which uniquely identifies the destination at which the voice messaging capabilities can be accessed. For example, if the voice messaging facilities are co-located with the telephone switching system 14, then such facilities can generally be accessed simply by dialing an extension-like number. The telephone switching system 14 will process this number and permit access to the voice messaging facilities.

If, on the other hand, the voice messaging facilities can only be reached by a long distance communication, then such an appropriate number is loaded into the register 164. As an additional example, a twelve digit number may be loaded into the register 164 to reach an outgoing trunk 24 so that a long distance call can be established. The twelve digit number may include the digit "9" to obtain an outside line, a "1" to signify a long distance call, an area code and a seven digit telephone number. Of course, many other digit translations may be effected to connect the calling party directly to a voice messaging facility.

Situations may arise in which the digits received from the calling party comprise neither an alternate extension number 156, a switchboard attendant number 160 nor a voice messaging designation 162. An erroneous telephone number may have been inadvertently dialed by the calling party. In this event, a message is selected 166 in the message storage unit 54 and transmitted to the calling party. This message may include informational content indicating that the telephone call cannot be completed as dialed, but that the calling party should redial the number. Control is then branched to decisional block 148 to again process the dialed digits, if any, received from the calling party.

In brief summary, it can be seen from the foregoing that with the provision of the call completion equipment 10, many alternatives are available to the calling party for completing a secondary telephone call, even though the primary called party cannot be reached. This is highly advantageous in view that the ability to communicate is important to businesses. It is also important to appreciate that the call completion equipment can be connected to a telephone switching system 14 with little, if any, modification to such switching system. As a result, the combining of the features of the call completion equipment 10, together with the those of the telephone switching system 14 provides additional communication capabilities not heretofore realized.

In accordance with another feature of the invention, the call completion equipment 10 can assist in completing a telephone call when the telephone set 16 of the called party is off-hook, and the called party is therefore busy. According to the program flow chart of FIG. 3b, the communication line 22 is again tested 170 to determine if, in the absence of a ringing signal being detected by the call progress tone detector 50, the called party has answered. If the call progress tone detector 50 detects neither a ringing signal 132 nor a busy signal 170, it can be presumed that the called party has responded to the ringing signal. If the call progress tone detector 50 detects a busy signal 170, then the call is processed toward a completion satisfactory to the calling party.

According to program block 172, the microprocessor 74 is directed to a camp-on table 87 to determine whether the called party, as determined by the digits received 100, is flagged for automatic camp-on. Automatic camp-on is a feature of the invention in which predefined telephone sets 16 of the telephone switching system 14 have an increased degree of relevance such that it is desirable to encourage the completion of telephone calls to such selected telephone sets. The completion of the telephone call is encouraged by automatically camping on the line and not giving the calling party the option to dial alternate numbers. The calling party does, however, have the option of terminating the call by simply hanging up. Those telephone sets utilized, for instance, by a sales organization may be designated for automatic camp-on. In many situations the business of a company is related to the number of telephone calls completed by customers or potential customers to its sales organization. Thus, according to the invention, calls directed toward these specially flagged telephone sets are processed in such a manner that the completion of the call from the calling party to the telephone set 16 is encouraged.

If the camp-on table 87 indicates that the telephone number dialed is flagged for automatic camp-on 172, an appropriate message is selected from the message storage unit 54 and transmitted 174 to the calling party. The message does not give the calling party an initial alternative for completing the call to another destination, but rather informs the calling party of the busy status of the called telephone set, and that further attempts are being made to complete the call. The microprocessor 74 then temporarily disconnects the communication line 22, as noted in flow chart block 176. Importantly, the incoming trunk loop 20 is still closed, whereby the calling party is yet in communication with the call completion equipment 10. The microprocessor 74 waits for a programmable period of time 178 before again seizing 180 the telephone switching system communication line 22. The digits initially received 100 by the calling party are again loaded 182 and transmitted to the telephone switching system 14. Decision block 184 illustrates that the call progress tone detector 50 is again invoked to determine whether the called telephone set 16 is busy. If not, the program branches back to decisional block 132 where the ringing status or the answered call status is determined. The call is then processed according to the portion of the processor control complex program shown in FIG. 3.

In the event that the called telephone set 16 is yet busy 184, the microprocessor 74 determines whether the digits have been retransmitted a predetermined number of times 186. If not, the program is again directed to flow chart block 176. If the digits received from the calling party have been transmitted a predetermined number of times 186, the microprocessor 74 ascertains whether the message has been transmitted 174 a predetermined number of times. On a negative determination of this decision 188, the program branches back to block 174 where the message concerning the busy status of the call is retransmitted to the calling party.

In the preferred form of the invention, the digits of the called telephone set 16 are periodically retransmitted to the telephone switching system 14 about six times for each transmission of the message 174. A test of the busy status of the telephone set 16 is conducted on each transmission of the digits. Moreover, the message is transmitted about four times before it is determined that a call cannot be completed to the called telephone set 16 within a reasonable period of time. In this event, program control is branched from decisional block 188 to block 152 where the services of the switchboard attendant 18 are invoked.

With reference back to decisional block 172 of FIG. 3b, control of the microprocessor 74 is directed to block 190 if the called telephone set is not flagged for automatic camp-on. As noted above, it has been predetermined that special measures for some telephone sets are not to be taken in encouraging a call to be completed thereto. According to the program of block 190, a message is selected from the message storage unit 54 and transmitted to the calling party concerning instructions for reaching alternate communication destinations. In this instance, the alternate destinations include an alternate telephone extension, the switchboard attendant, the voice messaging capability and a camp-on option. If the calling party desires to dial 192 information indicative of the camp-on option, the decisional block 192 branches the program to the input of block 176. If the camp-on option is not dialed, the program is branched to decisional branch 156 where it is decided which of the other three alternative destinations were dialed.

With the foregoing system operation, calling parties are provided with alternative secondary destinations when the primary destination is busy. The call completion equipment 10 provides a capability for enabling the calling party to selectively choose various secondary destinations for completing the call. Also, the call completion equipment 10 of the invention can be programmed to give added significance to certain extension telephone numbers, such that when busy, special measures are taken to encourage the completion of the call thereto. The special measures taken include providing automatic camp-on of the busy primary extension, without the calling party having selected the same. In other situations, an instructional message may inform the calling party of the busy status of the called party, and inform the calling party of the various secondary destinations, including a camp-on feature if the calling party so desires.

In keeping with the invention and with the realization of the advantages thereof, the call progress tone detector 50 is adapted to initially "learn" various call progress tones transmitted by other switching systems so that such tones can be subsequently detected. Wit the call progress tone detector 50 of the present invention, a highly accurate and versatile detector is provided, using conventional frequency filter and detector circuits, together with data processing programs. An economical detector is thereby provided which is capable of discriminating between the various call progress tones which may be generated by the telephone switching system, or other switching systems, without a high degree of precision.

FIG. 4 illustrates a portion of the call completion equipment 10 related to the call progress tone detector 50. The switching stage 46 has an input from the hybrid 38, and a pair of outputs coupled to the call progress tone detectors 50 and 52. The switching stage 46 is provided with a control input 47 for controlling which one of the tone detectors 50 or 52 should receive the tones. The tone detectors 50 and 52 may be alternately switched to provide tone detection capabilities between two communication lines 22 directed to the switching system 14. The switching stage 46 is driven by the microprocessor 74 through one of the interface outputs 84. The call progress tone detector 50 includes four conventional tone decoders with digital outputs designated f1, f2, f3 and f4. Each of the individual tone decoders comprising the tone detector 50 is responsive to a very narrow band of frequencies for producing a corresponding digital output when such frequency is decoded. Each digital output of the tone detector 50 is driven to a logic high level on the decoding of the respective frequency (f1-f4). The four digital outputs of the tone detector 50 are coupled to the microprocessor interface 80 as a four-bit word. In this manner, the microprocessor 74 can determine which of the four frequencies are present by ascertaining which digital outputs of the call progress tone detector 50 are at logic highs.

FIG. 5 is a table illustrating the standard call progress tones processed according to the preferred embodiment of the invention. The call progress tone detector 50 can also detect dial tone which comprises a composite 350 hertz and a 440 hertz frequency. These frequencies are mixed together to provide a unique combination not normally encountered or confused by human speech. It is also noted that the cadence of the dial tone is constant, meaning that it is not interrupted by inactive or pause periods. Thus, the call progress tone detector 50 can determine the existence of dial tone by noting when the f1 and f2 outputs of the tone detector 50 are at logic high levels.

Busy tone includes a 480 and 620 hertz composite signal which is active for one-half second, and inactive for one-half second. Thus, when the switching stage 46 switches line 44 carrying a busy tone to the call progress tone detector 50, the f3 and f4 outputs thereof will be active for one-half second, and will be at an inactive or pause state for the next half second. The active and inactive periods alternate for as long as the busy tone is applied to the tone detector 50.

The ring back tone includes a composite 440 and 480 hertz tone which is active for two seconds and inactive for four seconds. On the detection of the ring back tone, the call progress tone detector 50 will produce a logic high state on the f2 and f3 outputs for two seconds, and then will produce logic lows for four seconds. These frequencies f1-f4 are conventional in the telephone industry and thus are the signals output by switching systems to signify progressive states of the call. As is well known, a dial tone alerts a calling party to input digits representative of the destination telephone set. The busy tone signifies that the call has been placed, but the called party is busy. The ring back tone alerts the calling party that the called party is being notified as to an incoming call. It will be seen that for other tones conventionally used in the telephony field, other conventional tone detectors need only be added to the call progress tone detector 50 of the invention. If a fifth or sixth tone would be added for detecting yet another call progress tone, then a five-bit or six-bit word would be output from the tone detector 50 to the microprocessor interface 80.

With reference now to FIG. 6 of the drawings, there is illustrated the manner in which the microprocessor 74 scans or samples the interface inputs 84 associated with the call progress tone detector 50. In the example, it is assumed that a busy tone is being applied to the switching stage 46, and switched to the input of the tone detector 50. The f3 and f4 frequency components are shown synchronized in half-second active and inactive states. Shown directly below the respective f3 and f4 detector outputs is a first and second sample taken by the microprocessor 74. The arrows indicate the points in time at which the tone detector outputs are sampled. In order for the call completion system to "learn" the characterization of a particular call progress tone, the signal is simply applied to the tone detector 50 and the processor complex 72 samples the detector outputs over a number of tone cycles. To "learn" the characteristics of, for example, a busy tone, a system craftsman simply transmits the digits of an extension number to the switching system 14. The extension number must correspond to an telephone switching system telephone set 16 known to be off-hook, and thus busy.

The system timing of the processor complex 72 drives the interface 80 such that the outputs of the call progress tone detector 50 are sampled at 100 ms. intervals. The upward directed arrows illustrate thirteen samples 200-224 to encompass a full active and inactive period. The logic state sampled by the microprocessor 74 is shown directly under the respective arrow. With the noted sampling frequency, the digital active state of the f3 and f4 detector output can be sampled six times, as shown by processor sampling example number one. However, the inactive states of the f3 and f4 output are shown undergoing only four samples. While the sampling of the tone detector 50 outputs are asynchronous with regard to the tone cycles themselves, the processor sampling example one illustrates a maximum number of samples taken of the active state, and a minimum number corresponding to an inactive state. Samples 202 and 212 are coincident with the rising and falling edge of the active state, and therefore could be interpreted by the tone detector 50 as logic high levels. Of course, either or both of the samples coincident with a transition of the tone detector output could also be decoded as a logic zero. Nevertheless, the sample of example one provides a busy tone characterization of six logic ones and four logic zeros corresponding to the active and inactive states.

Since the sampling is asynchronous with respect to the occurrence of the tone cadence, sampling example two shows a situation in which the sampling intervals are somewhat displaced with respect to the transitions of the tone detector f3 and f4 outputs. The displacement in time due to the asynchronous operation of the sampling timing is shown as 226. In this example, samples are taken shortly after the transitions have occurred. However, since conventional tone detectors include an inherent delay in providing an output indicative of an input, the instantaneous existence of the busy tone applied to the tone detector 50 may not be indicated as such at the detector output. Sample 228 indicates this situation. With sample 228, while the f4 tone at the input of the tone detector 50 has been driven to an active state, the output of the tone detector is still detected as a logic low level. On the other hand, when sample 230 is taken, the detector output is at a logic low, and sampled accordingly. Thus, with the sampling of example two, the same busy tone is characterized as four digital high levels and six digital low levels.

The microprocessor 74 uses this digital notation of (6,4) and (4,6) as a representation of the cadence of the particular busy progress tone learned. The busy tone of another switching system connected to the call completion equipment may be learned with a slightly different representation. For other tone types with longer active periods, the number of digital ones will be greater. For shorter active periods, the converse is true. There is a similar correspondence between the length of the inactive period and the number of digital zeros. Concurrent with the generation of the cadence format, the tone detector 50 provides the microprocessor 74 with an indication of the frequency of the tone received. The frequency of the tone detected is simply the noting of which one or more of the call progress tone detector 50 outputs go to an active state. Based upon the cadence and the frequency, the specific type of call progress tone can be determined. If dial tone is received from the telephone switching system 14, then this is the indication that digits can be outpulsed to the switching system 14. If a busy or ring back signal is received, as characterized by the cadence and frequency of FIG. 5, then the invention can provide the calling party with alternate call completion routes.

Figure 7:
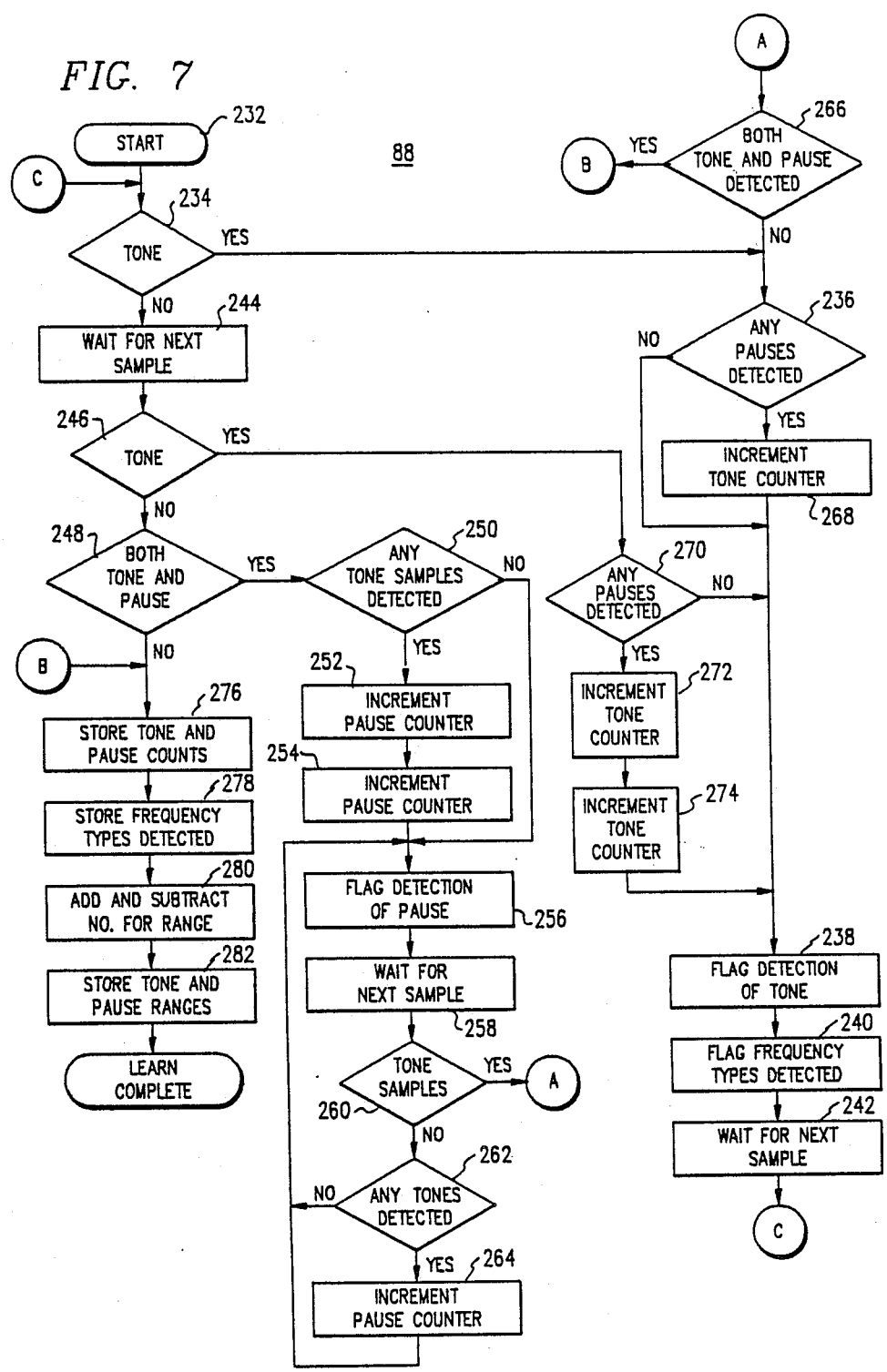
FIG. 7 is a program flow chart illustrating the steps executed by the processor in learning the signature of a particular call progress tone.

FIG. 7 illustrates another important feature of the invention, wherein the detection of the frequency and cadence of the call progress tones are self-adaptive with regard to the particular switching system connected therewith. In other words, the self-adaptive feature of the invention permits the system to "learn" the particular frequency and cadence characteristics of each of the call progress tones, based upon the specific tones transmitted by the telephone switching system tone generator. The call progress tone detector characteristics are thereby matched with those of the tone generator associated with the telephone switching system 14, wherein the accuracy by which the tones are detected is optimized.

The technique utilized to achieve the self-adaptive detection feature is shown in FIG. 7. While this feature of the invention can be accomplished using hardware in the nature of electrical circuits, it can also be accomplished using a program controlled processing system, such as described above. The flow chart of FIG. 7 illustrates the control of the processor complex 72 and the other equipment of the invention to adapt the call progress tone detector 50 to the particular characteristics of the exemplary switching system tone generator (not shown). For purposes of example, the flow chart of FIG. 7 will be described in terms of "learning" the busy tone sampled by the processor complex 72 in FIG. 6. It should be appreciated that the tone detection scheme is carried out asynchronously with regard to the tones being detected, and therefore the start of the learning cycle can occur anywhere within the active or inactive periods.

In order to learn the busy tone, an extension number of a known busy telephone set is transmitted to the telephone switching system 14. For the purposes of this example, it is assumed that the switching system will automatically return the standard busy progress tone having 480 and 620 hertz components, and a 50% duty cycle of half second periods. However, the invention is adapted to "learn" any combination of cadence and frequency returned by the telephone switching system indicating a busy condition. For frequencies of tones other than those described herein, tone detectors sensitive thereto need only be added. For example, in telephone switching systems, a busy signal having frequency and cadence components different than that shown in FIG. 5 may be learned by the invention and then designated as a busy signal. Thereafter, when the invention detects such a combination, the called telephone will be defined as busy. The same holds true for defining ringing signals.

The routine 88 of FIG. 7 is invoked during the "learning" process so that the frequency and cadence characteristics of a busy tone can be learned. Assuming that tone examination starts with sample 208 (FIG. 6) occurring during an active cycle, the flow chart is executed starting with block 232.

All counters of the tone learning scheme are initialized by resetting them to a zero count. When the first sample 208 is found to correspond to a logic one level, i.e., a tone active period, the processor control 72 is branched from block 234 to 236. Since this is the beginning of a detection cycle, no tones or pauses have been detected preceding the first sample. Therefore, a negative determination of pauses found according to block 236 causes a branching to block 238 of the flow diagram. A flag is set indicating that a tone has been detected by the first sample. Of course, the various outputs of the call progress tone detector 50 provide an indication of the frequency components of the tone input to the detector. This is noted by block 240 of the flow diagram.

A next sample is taken, as noted in block 242 of the flow diagram, and return is made to the input of decision block 234. The path traversed through blocks 234-242 are traversed again for subsequent samples 210 and 212. However, when sample 214 of FIG. 6 is taken, the program is redirected from decision block 234 to he block of 244, where yet another sample is taken, i.e., sample 216. In the event a tone is not detected in decision block 234, an additional sample is taken as shown in block 244 to verify an erroneous tone decode has not occurred, due to a glitch or abnormality in the sample of the electrical pulse taken.

Proceeding with the flow diagram, decision block 246 is next encountered, wherein it is determined if a tone is present. In the example, the decision will be in the negative, whereupon the program is branched to block 248. The negative result arises from the fact that both a full active period and a full inaction period have not occurred. In decision block 248, it is decided whether both a full tone period and a full pause period have been previously encountered. On a negative decision, the program flow is branched to decision block 250. If any tone samples have been previously encountered, the pause cadence counter is incremented twice, as shown in blocks 252 and 254. This double incrementing arises from the detection of pause samples 214 and 216. It should be noted that a pause can be detected only when a tone has previously been detected to assure that a complete or full pause has been measured. A flag is then set 256 indicating that a pause has been detected, and a subsequent sample is taken 258. Since sample 218 is not a tone sample, program control is branched from block 260 to 262 where it is determined whether any tones have been detected. Because prior samples have detected tones, program control branches to block 264 where the pause counter is again incremented. The loop comprising blocks 256, 258 and 260–264 continues to be processed for all subsequent samples taken during the silent or pause period. However, when sample 222 is taken, a tone sample is again detected, whereupon program control branches from block 260 to decision block 266. Since both a full tone and pause period have not yet been detected, program control branches from decision block 266 back to the input of decision block 236.

At this point in the learning cycle, the pause counter could include the full number of counts corresponding to the number of samples taken during the pause period. Decision block 236 branches to block 268 where the tone cadence counter is incremented. It should be noted that the tone cadence counter is incremented for the first time by the occurrence of sample 222. Importantly, the previous tone samples, e.g., samples 208, 210 and 212, were not effective to increment the tone cadence counter. This is because the tone cadence counter does not begin to increment until at least a portion of a pause period has been detected. It should be understood that the full number of samples taken of a tone period can only be determined by first detecting at least the last portion of a pause period. In like manner, the full number of samples taken during a bona fide pause period can only be accomplished by first detecting at least the last portion of a tone period.

After the tone cadence counter is incremented in block 268, blocks 238–242 are again traversed and return is had to decision block 234. This path continues to be traversed, wherein the tone cadence counter is incremented, until a pause sample 225 is encountered. Program control is then branched from block 234 to 244 where another sample is taken. Since sample 226 is also not a tone sample, a pulse glitch has not occurred, and program control branches to decision block 248. Program blocks 270–274 may be traversed by the microprocessor 74 in the event a pause, caused by a glitch, is encountered within an active tone period. If a single pause sample occurs within a tone period, it is ignored, and the tone counter is incremented as if no pause has occurred.

In view that both a full tone period and a full pause period have been detected, control is branched from decision block 248 to block 276 where the microprocessor 74 stores the counts accumulated in the tone and pause cadence counters. The microprocessor 74 also stores 278 the particular frequencies of the call progress tone detected. After having progressed through a full pause period and a full tone period, the tone has been fully characterized and the "learning" of the progress tone is accomplished.

In order to account for the variances in the cadence timing and the asynchronous nature in which samples are taken of call progress tones, the pause count and the tone count stored 276 are used to form respective ranges. This can be appreciated as not all cadence timing of tones are precisely as noted in FIG. 5. Also, by noting the sampling results of examples 1 and 2 of FIG. 6, it can be seen that for the same call progress tone detector output, a different number of tone and pause samples can be obtained. This can be a result of the asynchronous sampling. In example 1, the sampling occurs coincident with the rising and falling edges of the tone detector output. Six samples indicate a tone and four samples indicate a pause. In example 2, the sampling is displaced by a time indicated by reference character 226. In this instance, four samples indicate a tone and six samples indicate a pause.

Assuming the tone was learned from example 1, the tone count would be six and the pause count would be four. A range is formed by adding a number to the pause and tone counts, and by subtracting a number from the pause and tone counts. In practices, it has been found that by adding and subtracting the number two with respect to the pause and tone counts, a range is obtained against which subsequently detected tones can be compared and determined with a high degree of accuracy whether the cadence was that of ringing or busy. Depending on the circumstances, other numbers may be added and subtracted, and even one number may be found to be added and a different number subtracted.

Flow diagram block 280 indicates the addition and subtraction of the selected number to the pause and tone counts. In the example, the range for the tone count would be 4–8 (6±2), meaning that a tone detected having from four to eight tone counts would be a candidate for categorization as a busy signal. The pause count range would be 2–6 (4±2). These ranges are inclusive, in that, for example, if a pause were detected as two or six counts, or anything in between, the tone would be a candidate for a busy signal determination. With regard to the sampling of example 2, it can be seen that the result thereof would fall within the above noted ranges and would be a candidate for a busy signal determination.

If, due to electrical glitches or other anomalies, a tone or pause count of three or less is registered during the learning of a call progress tone, the lower limit of the range, as a result of subtraction should not be less than two. In other words, in comparing a detected progress tone with the range obtained during a previous learning process, at least two samples of a pause of a tone must be detected in order to fall within the range. Otherwise, if the lower end of the range were one, the detection of a single glitch could fall within the range and would be interpreted as a valid pause. As illustrated in flow diagram block 282, the pause and tone count range, as determined according to the foregoing criterion, is stored for later comparison with the detection of call progress tones. As will be discussed in more detail below, the frequency of the detected tone is also considered before a final determination is made as to the categorization of a detected call progress tone.

The understanding of the detection and categorization of busy and ringing call progress tones is facilitated from the above-described learning process. The categorization of call progress tones is identified in flow diagram block of 132 of FIG. 3a, and blocks 170 and 184 of FIG. 3b. Call progress tone detection and categorization is illustrated with the flow diagram of FIG. 8.

Figure 8:
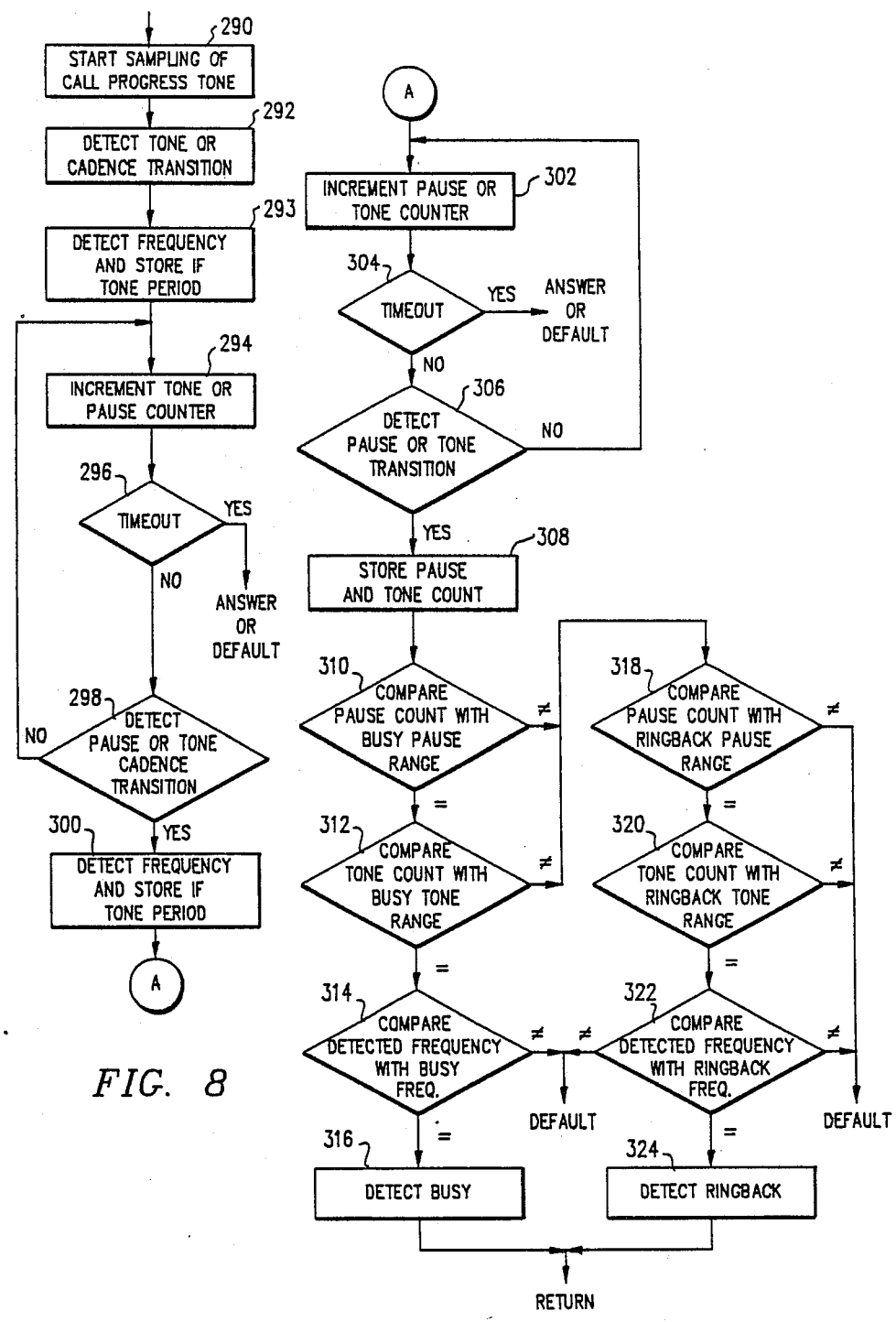
FIG. 8 is a program flow chart of the busy and no-answer detecting schemes of the invention.

The flow diagram of FIG. 8 is not illustrated on a per sample basis as was done in FIG. 7. Rather, the call progress tone categorization scheme of FIG. 8 shows the general processing of the samples. The sampling of a call progress tone is depicted in block 290 of the flow diagram. The sampling continues until a tone or a pause transition is detected 292. As noted in the learning process, at least two samples are needed to determine a bona fide transition between a tone period and a pause period, and vice versa.

After a transition, the samples of the tone or pause period are counted 294. The frequency is also determined and stored 293. In the counting sequence, a timer 296 is activated so that counting cannot continue indefinitely if a faulty tone generator is outputting a continuous tone, rather than one with a cadence. If the timer 296 times out during the counting, either the call is considered answered, or a default routine is entered.

The pertinent tone or pause counter continues to be incremented 294 until a subsequent pause or tone cadence transition is detected 298 when the transition 298 is detected, the frequency of the tone is detected and stored 300, if such period is a tone period. Again, the pause or tone counter is incremented 302 to determine the cadence period. Another timer 304 is located within the counter increment loop 302 to guard against indefinite periods of silence or steady tone.

On the detection of yet a subsequent pause or tone cadence transition 306, the program branches to block 308 where the counts of the pause and tone counters are stored. A comparison of tone and pause counter numbers, and the frequency components, with the signatures of the learned call progress tones is conducted to categorize the detected tone as one of the learned tones. As shown in flow diagram block 310, a comparison is made between the pause counter number and the range previously established for the pause period of the learned busy signal. On finding equality, or that the pause counter number lies within the range, the program branches to block 312.

In block 312, the tone counter number is compared with the range established for the tone period of the learned busy signal. If equality is found, the program branches to block 314 where the frequency components of the detected and the learned busy tone are compared. If no equality is found, a default condition exists and the invention acts accordingly, such as by transmitting reorder signal to the calling party. If, on the other hand, equality of frequency components are found between the detected and the learned busy tone, it can be safely assumed that the detected tone corresponds to a busy signal, as illustrated in block 316. The program then returns to call processing wherein the telephone call is processed according to the flow diagram of FIG. 3b.

The flow diagram block 310 of FIG. 8 branches to decision block 318 when there is no identity or correspondence between the pause counter and the range of the learned busy signal pause period. Accordingly, a comparison is then made between the pause counter number to ascertain whether it lies within the range previously established with respect to the pause period of the learned ringback tone. If equality is found, the program branches to block 320 where the equality of the ringback tone active periods are determined. In the event that the tone counter number is found to lie with the range previously established for the learned ringback signal active tone period, then a program branch is taken to decision block 322.

Program decision block 322 effects a comparison between the frequency components between the detected tone and the learned ringback tone. Of course, this comparison is conducted using digital signals since the call progress tone detectors 50 and 52 produce output digital signals indicative of the frequency components found during the learning and detection process. The noted comparisons may be accomplished utilizing either a software comparator or an electrical circuit signal comparator.

If frequency component identify is found between the tone detected and the learned ringback tone, it can be safely assumed that the detected call progress tone is a ringback tone 324. The program then branches to the routine of FIG. 3a when the call is processed in accordance therewith. When no identity is established in the comparisons of program blocks 318, 320 and 322, a default condition exists in which the tone detected is not one of the tones learned. The call may then be processed as with the above noted default condition of block 314.

FIG. 8 is illustrative of the comparison of a detected tone with the learned tones to find a correspondence therewith. Other comparison schemes may be employed to accomplish the same result. If there are more learned tones than illustrated, than yet other comparisons would be conducted until either correspondence is found or all learned tone comparisons are exhausted and no correspondence is found.

From the foregoing, busy/no-answer call completion equipment has been disclosed. When used in conjunction with a telephone switching system, the call completion equipment can detect a busy or no-answer condition of the primary called party, and present the calling party with alternatives for completing a call to secondary destinations. An instructional message is transmitted to the calling party concerning the busy/no-answer situation, and further informs the party of secondary destinations including, a switchboard attendant, an alternate switching system extension number, camp-on of the busy number, or the deposit of an audio message with a voice messaging facility. The instructional message informs the calling party as to the procedure in gaining access to each of the alternative destinations.

An automatic camp-on feature is also provided by the call completion equipment when predefined telephone sets of the switching system are busy. With the automatic camp-on feature, the calling party is not given options of alternative destinations, but rather is automatically camped-on the busy number. An instructional message informs the calling party of the busy situation and that attempts are being made to complete the call thereto. This feature affords the business using the telephone switching system the assurance of completing calls to the predefined telephones, such as those of a sales department. It can be seen that the call completion equipment provides the calling party the ability to complete a call, albeit to a secondary destination, when the primary destination is busy or does not answer. This saves time on the part of the calling party, who does not have to go on-hook to call again, and in many cases facilitates the business activities of enterprise associated with the telephone switching system.

Also provided with the call completion equipment is a technique for "learning" the signatures of call progress tones transmitted by the telephone switching system. The frequency and cadence characteristics of each call progress tone are learned and stored by the equipment of the invention, and used later for comparison with call progress tones received during the placement of telephone calls of the switching system. In this manner, expensive tone detector, and comparator circuits do not need to be used. The analyzing and comparing of the call progress tones are conducted using conventional detectors and software routines. Many simultaneous call progress tones can be analyzed and compared without the need of a large amount of electrical circuitry.

According to the foregoing disclosure, many changes can be made which are not relevant to the novel features taught by the invention. Bearing this in mind, the specific embodiments disclosed herein are intended to be merely exemplary of the invention and not restrictive thereof since various modifications readily apparent to those familiar with the art can obviously be made without departing from the spirit and scope of the invention as claimed hereinbelow. For example, the concepts of the invention may be employed with many types of switching systems, and may be made integral therewith rather than as add-on equipment. Moreover, those skilled in the art may prefer to adopt only some of the advantageous features of the invention, rather than all of tee features, in constructing the call completion equipment.

We claim:

1. A call processing system for use in conjunction with a telephone switching system for assisting a calling party in completing a call to the telephone switching system, comprising:
    means responsive to a first request for service from the calling party to place a call to a called party associated with the switching system, and for causing said telephone switching system to attempt to establish communications with the called party;
    a detector responsive to a signal from the switching system indicating an unavailability of the called party;
    a message generating unit responsive to an unavailability indication for instructing the calling party of alternate procedures for completing a call, said unit having means for instructing the calling party of a camp-on option and digit information to input to cause the call processor to carry out said option; and
    means responsive to a second request for service from the calling party in response to an input of digit information for causing the switching system to carry out said camp-on option.

2. The call processing system of claim 1 wherein said detector comprises means for detecting ringing signals and busy signals.

3. The call processing system of claim 2 further including means responsive to the unavailability signals for periodically interrogating the switching system to determine the unavailability of the called party during said camp-on option.

4. The call processing system of claim 3 further including means operative during periods of no interrogation for disconnecting the call processing system from the switching system.

5. The call processing system of claim 4 further including a subscriber line for interconnection between the call processing system and the switching system, and means for connecting the subscriber line during the periods of interrogation and means for disconnecting the line during other periods.

6. The call processing system of claim 1 further including means responsive to the second request for connecting the calling party to an attendant associated with the switching system according to said alternate procedures.

7. The call processing system of claim 1 further including means responsive to the second request for service for connecting the calling party according to said alternate procedures to a second called party.

8. The call processing system of claim 1 further including means responsive to the second request for service for placing said calling party in a hold condition, and for periodically causing said switching system to establish communications with the called party.

9. The call processor of claim 1, further including a memory for storing telephone extension numbers associated with called parties designated for an automatic camp-on.

10. The call processor of claim 9, further including a comparator for comparing entries in said memory with digits dialed by the calling party to determine if automatic camp-on should be applied.

11. The call process of claim 9, further including means responsive to a signal indicating an unavailability of the called party and responsive to said processor reading said memory for placing the calling party on automatic camp-on if so designated.

12. A call processing system for use in conjunction with a telephone switching system and operating autonomously therewith for assisting a calling party in completing a telephone call to the switching system, comprising:
    a first communication port directed to the calling party for communications therewith;
    a second communication port connected by a telephone subscriber line to the switching system for communication therewith;
    means for receiving dialing information from the calling party via said first port;
    means for transferring dialing information on said subscriber line to the switching system via said second port;
    means for detecting a response from said switching system via said second port indicating an unavailability of a called party associated with the dialing information;
    means responsive to the detection of said response for signaling the calling party of the unavailability of the called party and of the availability of optional destinations, and soliciting from the calling party information concerning a selection of an optional destination;
    means for receiving information from the calling party concerning the selected optional destination;
    means for transferring information concerning the optional destination to the switching system; and
    means for causing a communication path to be established between the calling party and the optional destination.

13. The call processing system of claim 12 further including means for interrupting communications with the switching system after detecting the response indicating unavailability.

14. The call processing system of claim 12 further including means for preventing a response indicating a busy signal from being transferred to the calling party.

15. The call processing system of claim 12 further including means for periodically testing the second port to detect the unavailability response.

16. The auxiliary equipment of claim 18, further including a telephone set subscriber line so that the auxiliary equipment can communicate with the switching system and so that the auxiliary equipment can transmit signals thereon for controlling the switching system.

17. The auxiliary equipment of claim 16, wherein said telephone set subscriber line comprises the only type of communication line between the auxiliary equipment and the switching system for carrying control signals therebetween, whereby said switching system requires minimal modification for providing connections of calling parties to alternate destinations when confronted with unavailable called parties.

18. Auxiliary call processing equipment connected to a telephone switching system for communicating between calling parties and the switching system for assisting calling parties in completing calls to the system, comprising:
means for receiving a telephone call from a calling party and for transferring the telephone call to the telephone switching system for connection thereof to a called party served by the switching system;
means for detecting an unavailability of the called party by receiving an audible signal from the telephone switching system of said unavailability;
means for instructing the calling party of the unavailability of the called party and for instructing the calling party of measures to be taken for placing a second call to an alternate destination associated with the switching system;
means responsive to a placing of another call by the calling party for transferring said second call to the switching system; and
means for causing the switching system to establish a connection between the calling party and the alternate destination.

19. The auxiliary equipment of claim 18 wherein said connection includes a switched connection in said auxiliary equipment for connecting the calling party to the switching system.

20. The auxiliary equipment of claim 18 wherein said means for detecting the unavailability comprises means for detecting a busy signal transmitted by said switching system.

21. The auxiliary equipment of claim 18 wherein said means for detecting the unavailability comprises means for detecting a ringing signal transmitted by said switching system.

22. A method for providing extended service to a telephone switching system, comprising the steps of:
connecting a call processor to a telephone subscriber line of the telephone switching system for communicating with the switching system;
receiving incoming calls to the call processor and signaling the switching system via the subscriber line as to the called party to be rung;
monitoring the telephone subscriber line by the call processor during an initial stage of the placement of a telephone call to a destination associated with the switching system;
detecting signals transmitted by the switching system on the telephone subscriber line indicating an unavailability of a completion of the call to the destination;
said detecting step including comparing signals received from the switching system with a prestored set of signals to determine a type of unavailability of the calling party;
transmitting a message by the call processor to the calling party concerning the unavailability and of an alternate destination; and
receiving dialing information from the calling party as to an alternate destination and transmitting said dialing information by the call processor to the switching system to thereby allow the completion of a telephone call to the alternate destination.

23. The method of claim 22 further including controlling a connection of the telephone line to the switching system in such a manner that the line is disconnected by the call processor after receiving the indication of unavailability, and reconnecting the line to allow the placement of a second call.

24. The method of claim 22 wherein the detecting step comprises detecting busy signals and ring back signals.

25. The method of claim 24 further including inhibiting ones of the signals from being transmitted to the calling party.

26. The method of claim 24 further including storing a telephone number initially dialed by the calling party, and periodically redialing the stored telephone number to the switching system in response to the detection of a busy signal.

27. The method of claim 22 wherein the transmitting step comprises transmitting a message to a calling party to dial an alternate telephone number.

28. The method of claim 21 wherein the transmitting step comprises transmitting a message to the calling party to dial a telephone number associated with an attendant.

29. The method of claim 22 wherein the transmitting step comprises transmitting a message to the calling party to dial a number associated with a voice store and forward service.

30. The method of claim 22 wherein the response to a detection of a busy progress signal, the transmitting step comprises transmitting a message that the calling party is busy.

31. The method of claim 26 wherein the transmitting step comprises transmitting a message to the calling party to dial information effective to allow the call processor to camp-on the telephone set of the unavailable called party.

32. The method of claim 22, further including comparing said signals to determine a busy or a no-answer type of unavailability.

* * * * *